INVENTOR
WILLIAM W. DAVIS
BY Griffin and Stokes
ATTORNEYS

Aug. 30, 1966 W. W. DAVIS 3,270,327

WORD SELECTION MATRIX

Filed Feb. 7, 1961 3 Sheets-Sheet 2

INVENTOR
WILLIAM W. DAVIS

BY Griffin and Stokes
ATTORNEYS

INVENTOR

WILLIAM W. DAVIS

BY Griffin and Stokes

ATTORNEYS

United States Patent Office 3,270,327
Patented August 30, 1966

3,270,327
WORD SELECTION MATRIX

William W. Davis, Minneapolis, Minn., assignor to Sperry Rand Corporation, New York, N.Y., a corporation of Delaware Filed Feb. 7, 1961, Ser. No. 87,575
30 Claims. (Cl. 340—174)

This invention relates to magnetic memory devices of the type used in data processing systems. More specifically, the present invention relates to apparatus for selecting and driving one word register of a plurality of word registers which comprise a memory device. This invention provides a selection matrix for a magnetic film memory device, said selection matrix also comprising magnetic film elements each of which is capable of driving a word line of the memory device.

The use of magnetic film elements as storage devices is disclosed in copending applications Serial No. 626,945, filed December 7, 1956, now Patent No. 3,030,612 and Serial No. 855,221, filed November 24, 1959, now Patent No. 3,076,958. The latter application also discloses the use of magnetic film elements as drivers for the word registers of a memory. However, the film driving elements of that application are operated in a different mode from the drive elements of the instant invention and required more power and a longer time interval for carrying out the selecting and driving operations.

The mode of operation of the present invention allows an improved structural arrangement of the magnetic drive elements and their associated printed circuits thus simplifying the fabrication process and reducing the overall cost of the memory.

The mode of operation of the selection matrix of the present invention permits a novel arrangement of the printed circuitry in both the memory and the selection matrix, resulting in fewer circuit elements, smaller power requirements, and less noise than heretofore attainable.

Therefore, an object of this invention is to provide a selection matrix comprising a plurality of magnetic film drive elements for applying signals to selected word drive lines in a memory, the sense windings of said drive elements and said drive lines comprising a single conductor.

An object of this invention is to provide a plurality of drive elements and drive circuits for the selection of a word line in a magnetic film memory, said drive circuits comprising a single conductive element having no intervening transformers, resistors or capacitors.

Another object of this invention is to provide a plurality of magnetic film selection elements, bias means for rotating the direction of magnetization of said elements to the hard axis, means for applying a steering field to said films, and means for driving a word line of a memory array by sensing the flux change when the direction of magnetization of said elements returns to the easy axis.

A further object of the invention is to provide a magnetic film selection matrix wherein the currents produced by positively biased matrix elements are added to the currents produced by negatively biased matrix elements to produced an output current which approximately equals the sum of the bias currents.

Still another object of the present invention is to provide a magnetic film selection matrix which performs as a coincidence gating device having no signal storage ability.

Another object of this invention is to provide a continuous closed loop conductor arrangement for selecting a word line in memory, said conductor being arranged such that return currents through unselected word lines are small and the net current in said conductor is zero where it crosses each sense line of the memory.

Another object of the present invention is to reduce the power required for driving a word selection matrix by providing a selection matrix comprising a plurality of pairs of magnetic film drive elements.

Another object of the invention is to provide an arrangement between the longitudinal bias winding and the sense winding of a magnetic film element whereby the coupling between the two windings is zero.

Further objects of the invention and its mode of operation will become apparent upon consideration of the following specification and drawings in which.

The magnetic film devices of the present invention may be of the type described in Patent No. 2,900,282. As explained in that patent, magnetic film elements having rectangular hysteresis loops may be formed by condensing a film of ferro-magnetic alloy such as nickel and iron on a suitable substrate. Furthermore, if the alloy is condensed in the presence of a magnetic field, the hysteresis loop may have a squareness ratio of .98 or more and the film will have an "easy" and a "hard" direction of magnetization.

It has been found that magnetic films produced in this manner have an important property in that the direction of magnetization of the film may be switched from the easy axis to the hard axis by the application of a magnetic field transverse to the easy axis. Furthermore, upon subsequent application of a small bias field parallel to the easy axis, followed by removal of the transverse field, the magnetization of the film will return to the easy axis with the direction being determined by the direction of the bias field.

Figure 1:
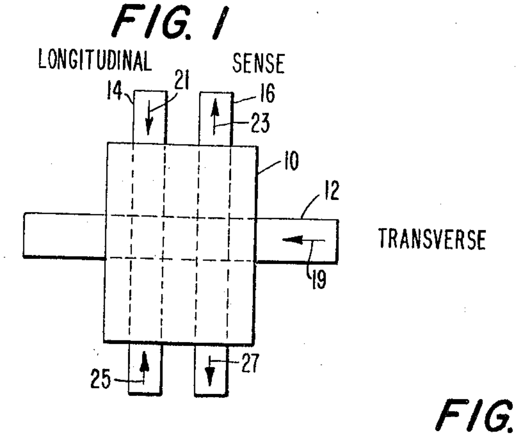
FIGURE 1 is a diagrammatic showing of a magnetic film drive element.
Figure 2:
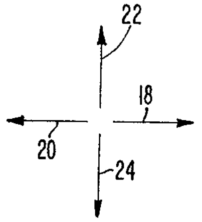
FIGURE 2 is a vector diagram illustrating the operation of the drive element of FIGURE 1.
Figure 9:
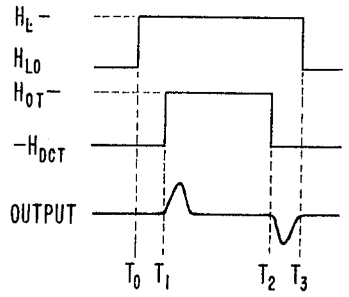
FIGURE 9 is a timing diagram illustrating the operation of the present invention.

This operation may best be understood by considering the vector diagram of FIGURE 2 and the timing diagram of FIGURE 9 in conjunction with the film diagram of FIGURE 1. The film 10 has a transverse bias winding 12 which runs parallel to the easy axis of magnetization and a longitudinal bias winding 14 which runs parallel to the hard axis of magnetization. A sense winding 16 runs parallel to the hard axis of magnetization for producing an output signal as the film switches between the hard axis and easy axis of magnetization.

In FIGURE 2, the vectors 18 and 20 indicate the two easy directions of magnetization of film 10 and vectors 22 and 24 indicate the two hard directions of magnetization.

Assume that vector 18 represents the initial direction of magnetization of film 10. A steady direct current continuously applied to transverse bias winding 12 in the direction indicated by arrow 19 creates a bias field transverse to the easy axis and causes the magnetization of the film to rotate to the hard axis in the direction indicated by vector 22. At time $T_0$ (FIGURE 9), a current 21 is applied to longitudinal bias winding 14 to generate a field $H_L$ parallel to the easy axis of magnetization. For all practical purposes the field $H_L$ may be assumed to have no effect on the magnetization of the film because of the overriding strength of the steady transverse field although in actual practice it causes a slight counterclockwise rotation of the vector 22. At time $T_1$, and while the longitudinal field is still present, the transverse field is cancelled by a current pulse on the transverse bias winding applied in a sense so as to oppose the steady D.C. bias current. This causes the transverse field to be cancelled or, as indicated in FIGURE 9, to change from $-H_{DCT}$ to $H_{OT}$. Upon cancellation of the transverse bias field the magnetization of film 10 will tend to return to the easy axis and, because of the direction of the longitudinal field, it will be steered counterclockwise to the direction indicated by vector 20. The changing flux produces an output signal in the sense winding 16 which flows in the direction indicated by arrow 23. At time $T_2$ the cancelling pulse ends and the steady direct current again generates the transverse bias field $-H_{DCT}$ which rotates the magnetization back toward and almost to the hard axis. At time $T_3$ the current producing longitudinal bias field $H_L$ is terminated thus permitting the steady transverse bias field to fully return the magnetization to the hard axis. It is seen therefore that film 10 is partially reset to the hard axis immediately after termination of the pulse which cancels the transverse bias field and is fully reset when the longitudinal steering field is removed. However, for all practical purposes the film may be considered restored after termination of the cancelling pulse applied to the transverse bias line. As shown in FIGURE 9, a second signal is produced in the sense winding as the magnetization returns to the hard axis, this signal being opposite in polarity to the signal produced as the magnetization moved to the easy axis.

The polarity of the signal induced in the sense winding at the time the cancelling pulse is applied to the transverse bias line is dependent upon the polarity of the current applied to the longitudinal bias winding. The situation assumed above illustrates the operation where current of the sense indicated by arrow 21 is applied to the longitudinal bias winding. On the other hand, if a current having a direction as shown by arrow 25 is applied to the longitudinal bias winding at time $T_0$, the magnetization of film 10 will rotate through a small angle in a clockwise direction with respect to the vector 22. Again, this rotation is negligible because of the large transverse bias field. Cancellation of the transverse bias field by a pulse on the transverse bias line at time $T_1$ enables the longitudinal steering field to steer the film magnetization to the easy axis in the direction indicated by vector 18. The changing flux again induces a current in sense winding 16 but this time it is in the direction indicated by arrow 27. Thus, an output signal may be generated on the sense winding with the polarity of the signal being dependent upon the polarity of the signal applied to the longitudinal bias winding.

Again, upon termination of the pulse which cancels the transverse bias, the steady direct current will generate a transverse bias field to reset the film with its magnetization in the direction indicated by vector 22.

The film 10 is unable to produce an output signal in sense winding 16 if no pulse is applied to the transverse winding to cancel the steady transverse bias field. Consider for example the case where the easy axis of magnetization of the film is in the direction indicated by vector 18. The steady transverse bias field holds the magnetization in the direction indicated by vector 22. The transverse bias field is of sufficient strength, so that the longitudinal bias field applied at time $T_0$ can only rotate the magnetization of the film through a very small angle. As stated before, this angle of rotation is so small that it fails to produce an output signal in the sense winding. With no cancelling pulse, nothing happens until time $T_3$ when the longitudinal field is terminated. At this time the magnetization again returns through the small angle to the hard axis and fails to produce an output signal. As will be shown later, this feature is also useful in performing a selection operation.

Figure 3:
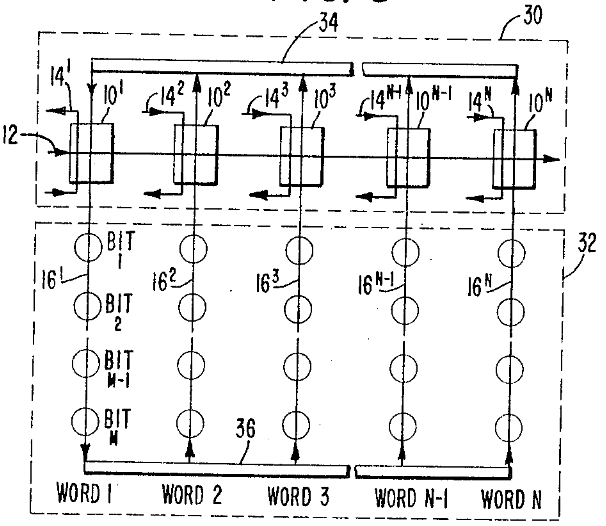
FIGURE 3 is a circuit diagram of a first embodiment of the invention.

FIGURE 3 shows a selection matrix 30 comprising a plurality of magnetic film elements 10$^1$ through 10$^N$. The films, henceforth, called drive elements, each have a longitudinal bias winding 14 and a sense winding 16 arranged parallel to the hard axis of magnetization. A single transverse bias winding 12 provides the transverse bias field for all drive elements.

Each sense winding 16 is extended to pass over the magnetic memory film elements 1 through M corresponding to one word of the memory array 32. Thus, any output signal induced in sense winding 16$^1$ by drive element 10$^1$ may be used to drive memory elements 1 through M of word 1 in the memory array. In like manner, any signal induced in sense winding 16$^N$ by drive element 10$^N$ may be used to drive memory elements 1 through M of word N.

For the sake of clarity the drive elements have been shown as rectangular and the memory elements as circular but it should be undertood that in actual practice the elements are not limited to the specific shapes.

The sense windings 16$^1$ through 16$^N$ are connected at one end to the common buss 34 and at the other end to the common buss 36. Thus, the circuit which drives the memory elements comprises a plurality of windings 16 connected in parallel to form a closed loop path. The closed loop requires no resistors, condensers, or transformers as are usually found in memory drive lines. In actual practice, the closed loop may be one continuous piece of copper conductor which may be formed by usual printed circuit techniques. This construction minimizes the number of elements required in the memory drive line, reduces fabrication costs, and also reduces the inductance of the circuit.

There are two possible modes in which a selection matrix constructed in accordance with the present invention may be operated. In the first mode, longitudinal bias current of one sense is applied to one drive element and current of the opposite sense is applied to the longitudinal bias windings of the remaining drive elements. This mode of operation is illustrated in FIGURE 3 wherein the directional arrows indicate that current of one sense is applied to longitudinal bias winding 14$^1$ and currents of the opposite sense are applied to longitudinal bias windings 14$^2$ through 14$^N$ to effect the selection of word 1. The drive elements of selection matrix 30 are actuated in the manner described with reference to FIGURE 1. That is, a steady field generated by transverse bias line winding 12 normally holds the magnetization of elements 10 toward the hard axis. The longitudinal bias currents are applied to the individual drive elements and tend to rotate the magnetization vectors, the direction of rotation being either clockwise or counterclockwise depending upon the sense of the bias currents. In the specific illustration being considered (selection of word 1 the magnetization of element 10$^1$ is rotated counterclockwise and the magnetization of elements 10$^2$ through 10$^N$ is rotated clockwise. While the longitudinal bias currents are being applied, the transverse bias field is cancelled by a pulse on the transverse bias winding and the magnetization of the elements is steered to the easy axis under the influence of the longitudinal fields. Note, however, that the magnetization of element 10$^1$ will return to the direction indicated by vector 20 (FIG. 2) while the magnetization of elements 10$^2$ through 10$^N$ will return to the direction indicated by vector 18, thereby inducing a current in one direction in sense winding 16$^1$ and inducing currents in the opposite direction in sense widings 16$^2$ through 16$^N$.

The common buss lines 34 and 36 permit currents induced in the non-selected sense windings 16$^2$ through 16$^N$ to flow through the selected sense winding 16$^1$. Assuming equal coupling of the film 10$^1$ by the longitudinal bias winding and the sense winding, and noting that the total current producing the longitudinal field on the drive film is due to the sum of the currents in these windings, it can be shown that the resulting current flowing in sense winding $16^1$ may have a value approaching the sum of the positive and negative longitudinal bias currents.

If the current induced in sense winding $16^1$ is $i$, then the return currents flowing in each of the unselected sense windings is $i/N-1$. In actual practice N will usually have a value of 16, 32, 64, or even larger, depending upon the number of word registers in the memory array, so the return currents have very small values and do not disturb the memory elements on the unselected sense windings. However, the current $i$ induced in the selected sense winding $16^1$ is sufficiently large to drive the memory elements associated with it.

Figure 4:
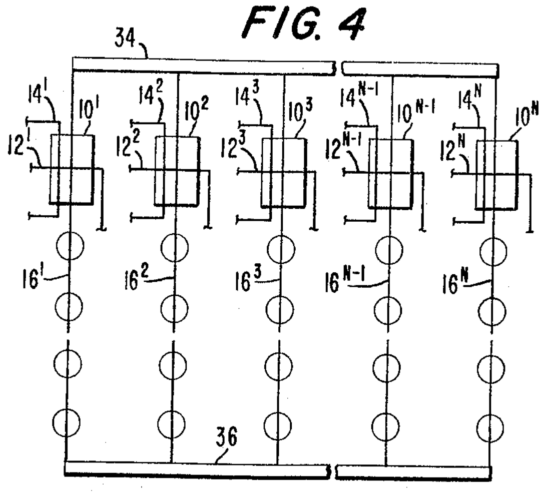
FIGURE 4 is a circuit diagram of a second embodiment of the invention.

FIGURE 4 illustrates a second embodiment of the present invention wherein selection is accomplished by application of a cancelling pulse to only one transverse bias winding at a time. This embodiment is similar to the embodiment of FIGURE 3 in that each drive element 10 has a sense winding 16 and a longitudinal bias winding 14 disposed parallel to the hard axis of magnetization. The sense windings are connected in common at one end by buss 34 and connected in common at the opposite end by buss 36. Each sense winding is extended and serves as the drive line for a specific word register in the memory.

Each drive element is provided with a separate transverse bias winding $12^1$ through $12^N$ to which steady transverse bias currents are applied. Separate transverse bias lines are provided so that the pulses which cancel the transverse bias fields may be selectively applied at each drive element.

To illustrate the operation of the embodiment shown in FIGURE 4, assume that it is desired to select or drive memory word register 2. A steady bias current is applied to all transverse windings 12 to hold the magnetization of all drive elements 10 toward the hard axis. A longitudinal bias current is applied to winding $14^2$, the polarity of this current being a matter of choice. While the longitudinal bias field is still present, the transverse bias field at drive element $10^2$ is cancelled by applying a cancelling pulse to transverse bias winding $12^2$. Upon cancellation of the transverse bias field, the magnetization of drive element $10^2$ is steered to the easy axis, the direction to which it returns being dependent upon the polarity of the longitudinal bias current. The resulting flux change induces a current in sense winding $16^2$ which may be used to drive word register 2.

As was the case with the circuit of FIGURE 3, the current in the selected sense winding will be $i$ and the current in the nonselected sense windings will be $i/N-1$. Again assuming equal coupling of the film by the longitudinal bias winding and the sense winding, it can be shown that the resulting current flowing in selected sense winding $16^2$ may have a value approaching the value of the bias current on line $14^2$. That is, the drive elements themselves consume very little of the signal power.

Assuming equal longitudinal bias currents are applied in both cases, the embodiment of FIGURE 3 produces an output current which is twice as great as the output current of the embodiment shown in FIGURE 4. However, the circuit of FIGURE 3 requires that longitudinal bias currents be applied to all elements whereas the circuit of FIGURE 4 requires that a bias current be applied to only the selected drive element.

It should be noted as a practical matter that the currents induced in the sense lines of FIGURES 3 and 4 are recirculating currents with the copper conductor acting as a shorted turn on the word selection matrix. These currents will decay at a rate dependent on the time constant $L/R$ as determined by the inductance and resistance of the circuit. Usually it is not necessary to have a long time constant in high speed memorys. However, if the circuit parameters are adjusted so that L is relatively large and R is relatively small, then the recirculating currents in the sense lines will drop to practically zero upon termination of the pulse which cancels the transverse bias field. This means that the reverse currents which flow at the end of the canceling pulse can be kept quite small as compared to the forward currents.

Figure 5:
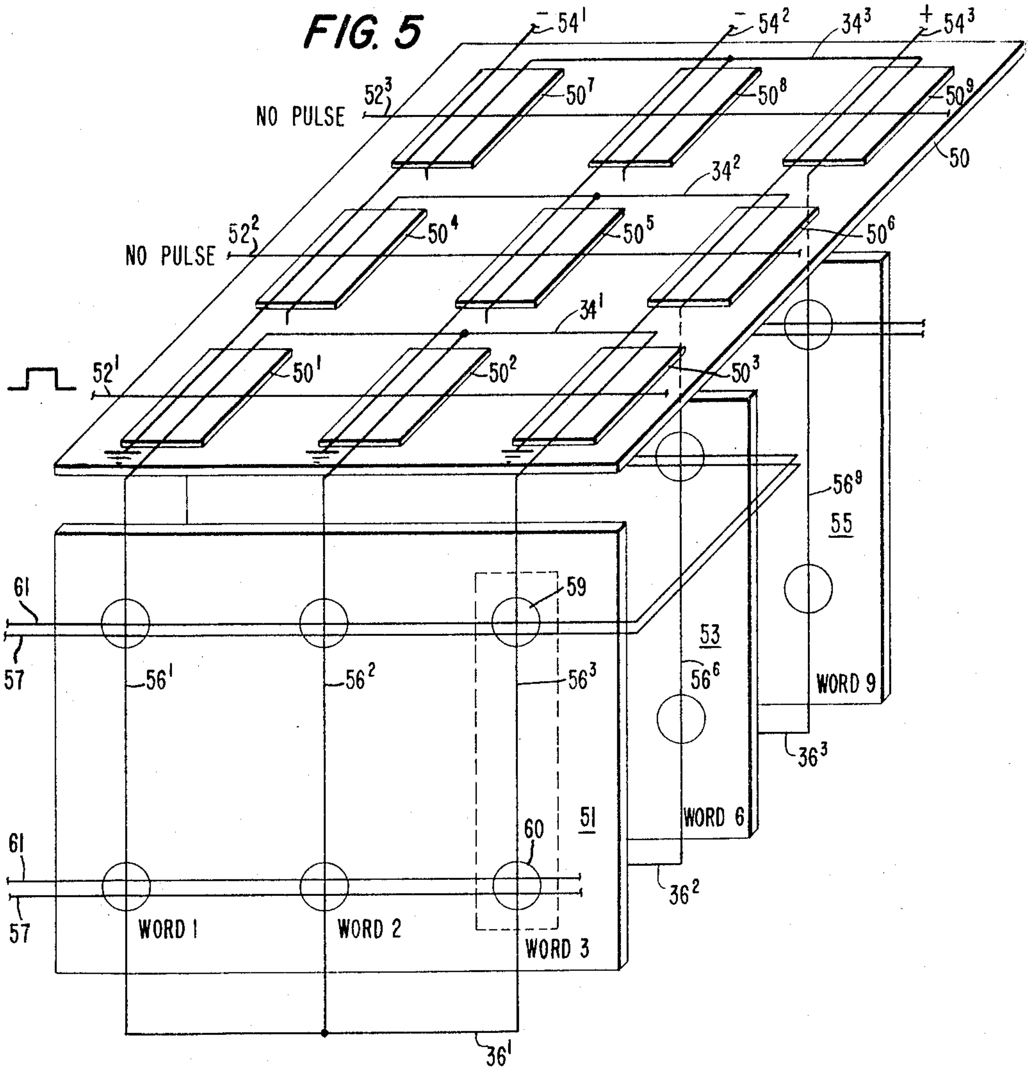
FIGURE 5 shows a two dimensional selection matrix for driving a three dimensional memory array.

FIGURE 5 illustrates how the selection methods described with reference to FIGURES 3 and 4 may be combined to form a selection matrix for selecting and driving any desired one of the plurality of word registers comprising a memory array. For purposes of illustration the memory array has been limited to three memory planes 51, 53, 55, each having three word registers capable of storing words two bits in length. It will be understood that the memory shown may be enlarged to include more word registers, longer word registers, or more or less memory planes. With the selection matrix of the present invention, and utilizing well known printed circuit techniques such as those disclosed in the aforementioned application Serial No. 626,945, memory elements of planes 51, 53, and 55 as well as the drive elements of selection matrix 50 may, in actual practice, be deposited in a single plane upon a suitable substrate. In order to simplify the drawing, only those windings necessary for a write operation have been shown, it being understood that those skilled in the art can supply additional windings for other purposes as taught by the prior art.

Suppose that it is desired to write binary information into word register 3 of the array. As indicated with reference to FIGURES 3 and 4, a steady transverse bias current is continuously applied to all transverse bias windings 52. Selection of the desired word register is accomplished by application of positive and negative longitudinal bias currents to bias windings 54 together with the application of a cancelling pulse to one of the transverse bias windings 52. The drive element which drives the selected word register is located at the position having both a transverse cancelling pulse and a positive longitudinal bias current. As shown in FIGURE 5, word register 3 is selected by applying negative currents to longitudinal bias windings $54^1$ and $54^2$, a positive current to longitudinal bias winding $54^3$, and a cancelling pulse to transverse bias winding $52^1$.

At the beginning of the memory selection cycle, negative currents are applied to longitudinal bias windings $54^1$ and $54^2$ and a positive current is applied to longitudinal bias winding $54^3$. These currents cause the magnetization of each drive element 50 to be rotated in one direction or the other about the hard axis. As explained with reference to FIGURE 2, this rotation is very slight because of the large transverse field present at this time.

Subsequent to the application of the longitudinal bias currents, a pulse is applied to transverse bias winding $52^1$ to cancel the steady transverse bias fields at drive elements $50^1$, $50^2$, and $50^3$. When the steady transverse bias is cancelled, the longitudinal bias fields are free to steer the magnetization of these drive elements to the easy axis and in doing so induce currents in the sense windings $56^1$, $56^2$, and $56^3$. With longitudinal bias currents as shown in FIGURE 5, the magnetization of drive elements $50^1$ and $50^2$ is steered to the easy axis in the negative direction thereby inducing currents of the negative sense in sense windings $56^1$ and $56^2$. The magnetization of drive element $56^3$ steered to the easy axis in the positive direction thereby inducing a current of the positive sense in sense winding $56^3$.

As explained above, the resulting current in sense line $56^3$ is much greater (in actual practice) than the currents in sense windings $56^1$ and $56^2$. Thus, by proper selection of circuit parameters, the current in sense line $56^3$ may be sufficiently large to rotate the magnetization of the memory elements of word register 3 through a given angle with respect to the easy axis while the currents in sense lines $56^1$ and $56^2$ are insufficient to rotate the magnetization of the memory elements of word registers 1 and 2 through such an angle. While the drive current is still present on winding $56^3$, pulses of the proper polarity are applied over windings 57 to generate magnetic fields at the memory elements of each word register. Since only word register 3 has a transverse drive current applied to it, the memory elements 59 and 60 of this word register are the only ones switched. Thus, the memory elements of word register 3 are addressed by the signals on winding $52^1$ and $54^3$ and data stored in them in accordance with the information pulses applied on windings 57.

During the restore portion of the memory cycle the cancel pulse is terminated and the magnetization of drive elements $50^1$, $50^2$, and $50^3$ is returned to the hard axis by the steady transverse bias field. The memory cycle is completed when the longitudinal bias currents are terminated.

One advantage of having the ends of the sense windings of each plane connected in common by busses 34 and busses 36 is the fact that the arrangement materially reduces the coupling between word drive windings 56 and memory sense windings 61. This may be explained by noting that sense windings 61 for the memory elements of the word array pass close to each of the word drive windings $56^1$ through $56^9$. In the example where word drive winding $56^3$ is selected, the current in this winding returns through drive windings $56^1$ and $56^2$. As a result, the net current crossing the memory sense windings 61 is zero. Hence, it is not as critical that the drive and sense windings be perpendicular as would otherwise be the case.

Figure 6:
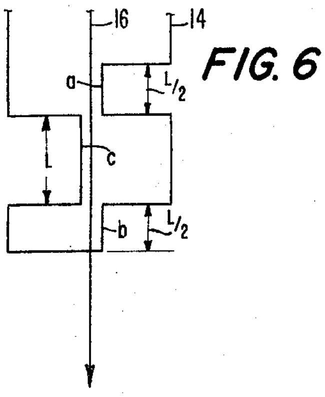
FIGURE 6 shows the configuration of the sense and longitudinal bias windings.

No mention has been made thus far as to the current induced in the sense winding at the time the longitudinal bias current is applied. Since it is desired to produce an output signal in the sense winding only at the time the transverse bias field is cancelled and the film magnetization returns to the easy axis, the signal induced in the sense winding by the longitudinal bias current must be minimized. This is accomplished as shown in FIGURE 6.

Segments *a*, *b*, and *c* of the longitudinal bias winding 14 are parallel to the sense winding and are the only segments placed close enough to have an effect on it. The remaining segments are either sufficiently far from the sense line as to have negligible effect or are oriented at right angles to the sense winding and thus incapable of inducing a signal in it. By disposing the longitudinal bias winding as shown, the segments *a* and *b* tend to induce a current in the sense winding in one direction and the segment *c* tends to induce a current in the opposite direction. Since the total length of segments *a* and *b* equals the length of segment *c*, the net current induced in the sense winding by a current in the bias winding is zero.

The foregoing description has shown that the longitudinal bias currents may be relatively small compared to the transverse bias currents since they merely steer the magnetization vectors of the films toward one or the other direction with respect to the hard axis, there being a natural tendency for the magnetization to fall back to the easy axis when the transverse bias is removed. That is, these currents are required to drive or rotate the magnetization vector through only a small angle with respect to the hard axis, this angle being just large enough to insure that the magnetization returns to the easy axis in the desired direction. Stated differently, the longitudinal bias field must be less than $H_C$ whereas the transverse bias field must be in excess of the anisotropy field, preferably about one-and-one-half times as great. This immediately suggests the advantage of forming an $N \times M$ array with N greater than M. With this arrangement only M high current transverse pulse drivers are needed whereas N low current longitudinal drivers are used. The reduction in power requirements is obvious.

Figure 7:
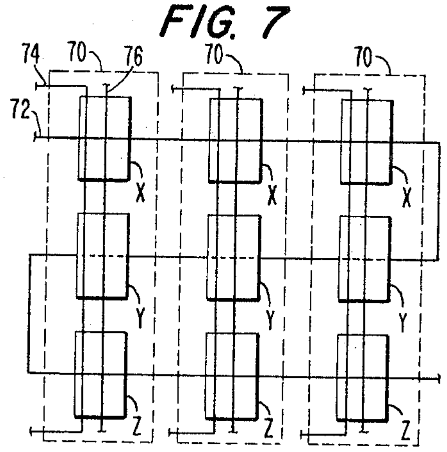
FIGURE 7 shows an alternative arrangement of the transverse bias winding.

The transverse bias current required to drive a matrix selection element may be further reduced by utilizing an arrangement such as that shown in FIGURE 7. The magnetic film of each matrix selection element 70 is divided into a plurality of film segments *x*, *y*, and *z*. This permits the transverse bias winding 72 to be threaded back and forth across the film segments in the manner shown. While this arrangement reduces the transverse drive current required, it has a disadvantage in that it increases by a small amount the delay along the transverse bias winding.

Figure 8:
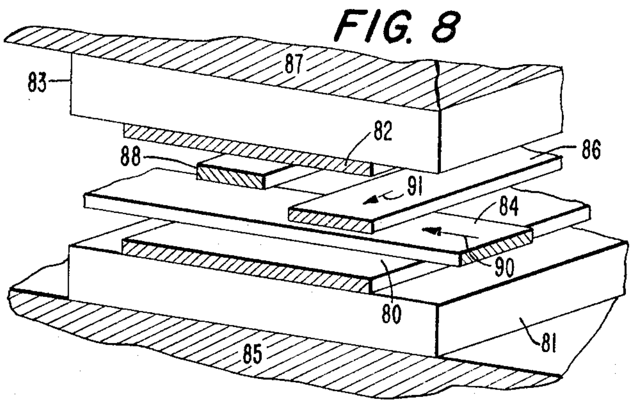
FIGURE 8 shows a selection matrix element having a pair of magnetic films.

The present invention is not limited to a selection matrix wherein each drive element comprises a single magnetic film. In fact, it is preferred that each drive element comprise a pair of magnetic films arranged as shown in FIGURE 8. This is particularly desirable because the easy axis of the magnetic film element is parallel to the narrow dimension (FIGURE 1).

Since the narrow dimension of the film element may be quite small, demagnetizing fields arising from free poles at the edges of the films increase the switching time and power requirements. It has been found that in rectangular film elements the demagnetizing field tends to rotate the magnetization vector toward the long dimension. Furthermore, it has been found that if two films are placed such that there is inductive coupling between them the demagnetizing effect is reduced.

The present invention utilizes these findings in the film pair shown in FIGURE 8 wherein a single drive element comprises a pair of drive films 80 and 82 deposited on suitable substrates 81 and 83, transverse bias winding 84, longitudinal bias winding 86, and sense winding 88. Copper ground planes 85 and 87 overlay and underlay the substrates 81 and 83 respectively.

With the longitudinal and transverse bias windings arranged as shown in FIGURE 8, the currents passing through them generate magnetic fields which act oppositely on the two films.

FIGURE 2 may be used to illustrate the effect of the longitudinal and transverse bias fields on the magnetization of films 80 and 82 when currents are applied in the directions indicated by arrows 90 and 91 of FIGURE 8. The vectors 18 and 20 represent the easy axes of films 82 and 80. The vectors 22 and 24 represent the direction of magnetization of films 82 and 80 respectively after the steady transverse bias current 90 is applied, and the vectors 20 and 18 represent the direction of magnetization of films 82 and 80 respectively during application of both the cancelling pulse and the longitudinal bias current 91. As explained with reference to FIGURE 2, the magnetization of both films is steered to the easy axis upon cancellation of the transverse bias current, the direction being determined by the sense of the longitudinal bias field.

With the films being oppositely magnetized by the bias windings as explained above, a relatively low magnetic circuit is completed for each of the films thus reducing the demagnetizing effects.

It is not necessary that the bias and sense windings be located between the film elements as shown in FIGURE 8. In an alternative arrangement, the longitudinal bias winding and sense winding may be disposed in the manner shown in FIGURE 8 with the transverse bias windings being positioned on the outside of each film pair.

While the novel features of the invention as applied to preferred embodiments have been shown and described, it will be obvious that various omissions and substitutions in the form and detail of the devices illustrated may be made without departing from the spirit and scope of the invention. It is intended therefore to be limited only by the scope of the appended claims.

I claim:

1. The combination comprising: a magnetic drive element of the type having an easy axis and a hard axis of magnetization and wherein the magnetization may be rotated to different direction in response to magnetic fields; means for generating a transverse bias field for holding the magnetization of said drive element to the hard axis; means for generating a longitudinal bias field; means operative during the presence of said longitudinal bias field for rendering said transverse bias means inoperative to control the magnetization of said drive element; magnetic memory means; and means for driving said memory means; said driving means comprising an electrical conductor for sensing the flux change at said drive element when said third means renders said first means inoperative.

2. The combination comprising: a magnetic drive element of the type wherein the magnetization may be rotationally switched between an easy axis and a hard axis of magnetization; bias generating means for holding the magnetization of said drive element to said hard axis; means for steering the magnetization of said drive element toward said easy axis in a desired direction in the absence of said bias; means for cancelling said bias while said steering means is operative; memory means; and means responsive to the change in flux at said drive element when said bias cancelling means becomes active for driving said memory means.

3. The combination as claimed in claim 2 wherein said bias cancelling means is only temporarily operative.

4. The combination comprising: a magnetic drive element of the type wherein the magnetization may be rotationally switched between an easy axis of magnetization and a hard axis of magnetization; first selectively actuated means for holding the magnetization of said drive element to the hard axis; second means for selectively steering the magnetization of said drive element toward said easy axis at the time said first means is rendered inactive; a plurality of magnetic memory elements; and means for driving said memory elements, said means comprising a conductor disposed adjacent said drive element and said memory elements for sensing the flux change at said drive element when said first means becomes inactive.

5. The combination comprising: a magnetic drive element of the type having an easy axis and a hard axis of magnetization; first conductor means disposed adjacent said drive element for selectively generating a magnetic field parallel to said hard axis; second conductor means disposed adjacent said drive element for generating a magnetic field parallel to said easy axis; a plurality of magnetic memory elements comprising a word register; and conductor means disposed adjacent said drive element and said memory elements whereby currents induced in said conductor means by flux changes at said drive element generate magnetic fields to drive said memory elements.

6. A magnetic selection matrix for selectively driving one of a plurality of word registers in a magnetic memory array, said selection matrix comprising: a plurality of magnetic drive elements of the type having an easy axis and a hard axis of magnetization; means for generating transverse bias fields to rotate the magnetization of said drive elements to the hard axis; means for generating longitudinal bias fields while said transverse bias fields are present; means for selectively cancelling said transverse bias fields while said longitudinal bias fields are present; and means for sensing the flux changes when said transverse bias fields are cancelled; said sensing means comprising a plurality of word register drive lines each of which senses the flux change at one of said drive elements for driving one of said word registers.

7. A magnetic selection matrix as claimed in claim 6 wherein said word register drive lines are electrical conductors connected in common at each end to form a plurality of parallel conductive paths.

8. A magnetic selection matrix as claimed in claim 6 wherein said transverse bias cancelling means is only temporarily operative.

9. A magnetic selection matrix as claimed in claim 6 wherein said word register drive lines are electrical conductors connected to each other at each end to form a plurality of current recirculation loops.

10. A magnetic memory selection matrix for selecting and driving the word registers in a magnetic memory array, said selection matrix comprising: a plurality of magnetic drive elements of the type having an easy axis and a hard axis of magnetization and wherein the direction of magnetization may be rotated under the influence of magnetic fields; first means selectively generating magnetic fields for rotating the magnetization of said drive elements to the hard axis; second means selectively generating magnetic fields for rotating the magnetization of said drive elements toward said easy axis; and means for driving the word registers of said memory array, said means comprising conductors responsive to the changes in magnetic flux at said drive elements when said first means ceases generating magnetic fields while said second means is generating magnetic fields.

11. A magnetic memory selection matrix as claimed in claim 10 wherein said conductors are connected in common at each end to form a plurality of current recirculation loops.

12. The combination comprising: a plurality of word registers each having a plurality of magnetic memory elements; a plurality of magnetic drive elements, said memory elements and said drive elements having an easy axis and a hard axis of magnetization; first selectively operable means for generating magnetic fields for rotating the magnetization of said drive elements to said hard axis; second selectively operable means for steering the magnetization of said drive elements toward said easy axis in the absence of magnetic fields generated by said first means; selectively operable means for rendering said first means inoperative to control the magnetization of said drive elements; and a plurality of sensing means inductively linked to said drive elements for selectively rotating the magnetization of said memory elements when said first means is rendered inoperative to control the magnetization of said drive elements.

13. The combination as claimed in claim 12 wherein said sensing means comprise a plurality of electrically conductive elements connected together to form a plurality of parallel conductive paths.

14. In a memory system of the type wherein the word registers elements and selection matrix drive elements comprise magnetic elements of the type having a hard axis of magnetization to which the elements may be driven by transverse magnetic fields and an easy axis of magnetization to which the elements return in the absence of transverse magnetic field, the improvement comprising: means for selectively generating longitudinal steering fields at said drive elements during the presence of said transverse fields; means for selectively inhibiting said transverse magnetic fields; and means for sensing the flux change at said drive elements when the magnetization of said drive elements returns to said easy axis, said sensing means comprising a plurality of parallel connected conductive elements each of which senses the flux change at one of said drive elements for producing magnetic fields at the memory elements of one of said word registers.

15. A magnetic memory word selection matrix for driving any selected one of $N \times M$ memory word registers, said selection matrix comprising: $N \times M$ selection elements of the type exhibiting rotational switching properties in the presence of magnetic fields; M selectively activated transverse bias means each of which selectively generates magnetic fields at N of said selection elements, said magnetic fields being of sufficient magnitude to rotate the magnetization of said selection elements from the easy axis to the hard axis of magnetization; N selectively actuable longitudinal bias means each of which selectively generates magnetic fields at M of said selection elements, said magnetic fields being of a magnitude less than the magnitude of the magnetic fields generated by said transverse biase means; and $N \times M$ drive means responsive to flux changes at said selection elements when said transverse bias means become inactive and the magnetization of said selection elements rotates toward said easy axis, for driving the memory word registers.

16. A magnetic memory word selection matrix as claimed in claim 15 wherein N has a value greater than M.

17. A magnetic memory word selection matrix as claimed in claim 15 wherein said selection elements comprise a pair of magnetic film elements.

18. A magnetic memory word selection matrix as claimed in claim 15 and further comprising: first means for activating said transverse bias means; second means for selectively activating said longitudinal bias means while said first means is active; and third means for selectively inactivating said first means while said second means is active; said $N \times M$ drive means being responsive to flux changes at said selection elements when said third means becomes active.

19. A magnetic memory word selection matrix as claimed in claim 18 wherein said drive means comprise $N \times M$ current conductors disposed in inductive relationship to said selection elements and said memory word registers, said conductors comprising M groups of N conductors each, with the conductors in each group being connected in common at each end to form a plurality of parallel current conducting paths.

20. A magnetic memory word selection matrix as claimed in claim 19 wherein said second means applies current of one polarity to one of said longitudinal bias means and currents of the opposite polarity to the remainder of said longitudinal bias means.

21. A magnetic selection switch comprising: a plurality of magnetic elements of the type having a hard axis of magnetization to which said elements may be driven by transverse magnetic fields and an easy axis of magnetization to which said elements return in the absence of transverse magnetic fields; first means for simultaneously and intermittently generating transverse magnetic fields at each of said elements; second means for simultaneously generating longitudinal steering fields at each of said elements; and third means for simultaneously sensing the flux changes at each of said elements upon termination of said transverse magnetic fields and the resultant rotation of said magnetization toward said easy axis.

22. A magnetic selection switch as claimed in claim 21 wherein said first, second and third means each comprise a single current conductive element disposed adjacent each of said magnetic elements.

23. A magnetic selection matrix for selectively driving the word registers of a memory array, said selection matrix comprising: a $M \times N$ groups of magnetic film drive elements of the type having a hard axis of magnetization to which said elements may be driven by transverse magnetic fields and an easy axis of magnetization to which said elements return in the absence of transverse magnetic fields; M means for selectively generating transverse magnetic fields at the magnetic elements of N groups of said magnetic drive elements; N means for selectively generating longitudinal steering fields at the magnetic elements of M groups of said magnetic drive elements; $M \times N$ magnetic element word registers; and $M \times N$ means inductively linked to the magnetic elements of said word registers for sensing the flux changes at each of said groups of magnetic drive elements upon termination of said transverse magnetic fields.

24. A magnetic selection matrix as claimed in claim 23 wherein said longitudinal steering fields are selectively generated while said selectively generated transverse magnetic fields are present, and said selectively generated transverse magnetic fields are terminated while said selectively generated longitudinal bias fields are present.

25. A magnetic selection matrix as claimed in claim 24 wherein said means for sensing the flux changes at each of said groups of magnetic drive elements comprises $M \times N$ electrical conductors each of which generates magnetic fields at the magnetic elements of one of said word registers in response to the flux changes sensed at one of said groups of magnetic drive elements; first means for electrically connecting one end of each of said conductors to a common point; and second means for connecting in common the other end of each of said conductors.

26. A magnetic selection matrix for selectively driving the word registers of a memory array, said selection matrix comprising: a plurality of magnetic elements of the type having a hard axis of magnetization to which said elements may be driven by transverse magnetic fields and an easy axis of magnetization to which said elements return in the absence of said transverse magnetic fields, there being one element associated with each of said word registers; means for generating a transverse magnetic field at each of said elements; means for generating a longitudinal field of one sense at a desired one of said magnetic elements and longitudinal fields of a second sense at the others of said magnetic elements; means for rendering said transverse magnetic field generating means inoperative; and means responsive to the flux changes at said magnetic elements when said transverse field generating means is rendered inoperative for driving the word register associated with said magnetic element at which the longitudinal field of said one sense was generated.

27. The combination comprising a plurality of magnetic drive elements of the type having an easy axis of magnetization and a hard axis of magnetization; means for selectively applying and terminating a transverse bias field to each of said drive elements to rotate the magnetization thereof to the hard axis of magnetization; means for selectively applying to each of said driving elements longitudinal fields tending to rotate the magnetization of said driving elements toward said easy axis in a first or a second direction; a current conducting sensing element inductively coupled to each of said driving elements for sensing the flux change at said driving elements when said transverse bias fields are terminated; and a plurality of word registers each comprising a plurality of thin film storage elements each having an easy axis of magnetization and a hard axis of magnetization, each of said sensing elements being inductively coupled to all the storage elements in a corresponding one of said word registers for driving said storage elements to the hard axis of magnetization.

28. The combination as claimed in claim 27 wherein said sensing means are conductors connected to each end to form a plurality of current recirculation loops containing only the resistance inherent in said conductors.

29. The combination as claimed in claim 28 and further comprising a plurality of output windings corresponding to the number of storage elements in one of said word registers, said output windings each being disposed adjacent one storage element in each of said word registers and substantially perpendicular to said sensing elements whereby the net current flowing through said current sensing elements perpendicular to said output windings is zero.

30. In a memory device of the type wherein the word register memory elements and drive elements are thin film magnetic elements having an easy axis and a hard axis of magnetization, the improvement comprising: a transverse bias winding extending across each of said drive elements in a direction parallel to the easy axis thereof, said transverse bias winding being disposed in proximity to said drive elements whereby the magnetic field generated by said bias winding in response to a current intermittently applied thereto rotates the magnetization of each of said drive elements to the hard axis; a plurality of longitudinal bias windings, each of said longitudinal bias windings being disposed in proximity to a corresponding one of said drive elements whereby the magnetic field generated by each of said longitudinal bias windings tends to rotate the magnetization of its corresponding drive element toward the easy axis of magnetization in a first or a second direction depending upon the direction of current flow through said longitudinal bias winding; and a plurality of sense windings each disposed in proximity to one of said drive elements whereby a current is induced in each sense winding in a first or a second direction depending upon the direction of current flow in the corresponding longitudinal bias winding at the time current ceases flowing in said transverse bias winding, each sense winding extending across all of the memory elements of one of said word registers in a direction parallel to their easy axes, said sense windings being connected to each other at both ends.

References Cited by the Examiner

UNITED STATES PATENTS

| | | | |
|---|---|---|---|
| 2,724,103 | 11/1955 | Ashenhurst | 340—166 |
| 2,734,187 | 2/1956 | Rajchman | 340—166 |
| 2,736,880 | 2/1956 | Forrester | 340—166 X |
| 3,023,402 | 2/1962 | Bittmann | 340—174 |
| 3,048,829 | 8/1962 | Bradley | 340—174 |
| 3,054,094 | 9/1962 | Stuckert | 340—174 |
| 3,060,411 | 10/1962 | Smith | 340—166 X |
| 3,079,597 | 2/1963 | Wild | 340—166 X |
| 3,081,452 | 3/1963 | Meinken | 340—174 |
| 3,084,336 | 4/1963 | Clemons | 40—174 |
| 3,092,812 | 6/1963 | Rossing et al. | 340—174 |
| 3,095,319 | 6/1963 | Williams | 340—174 |
| 3,111,580 | 11/1963 | Keefer | 340—174 |
| 3,111,652 | 11/1963 | Ford | 340—174 |
| 3,118,056 | 1/1964 | Martens et al. | 340—166 X |

OTHER REFERENCES

Pages 78–81, Sept. 9, 1960, Electronics.

Pages 22 and 23, Feb. 12, 1959, Digest of Technical Papers, "Thin Fim Memories," E. E. Bittmann.

JAMES W. MOFFITT, *Acting Primary Examiner.*

STEPHEN W. CAPELLI, NEIL C. READ, *Examiners.*

K. E. JACOBS, H. I. PITTS, M. S. GITTES, *Assistant Examiners.*